(12) United States Patent
Shan

(10) Patent No.: US 11,250,799 B2
(45) Date of Patent: Feb. 15, 2022

(54) DISPLAY PANEL AND DISPLAY DEVICE SUITABLE FOR LOW COLOR CAST DISPLAY

(71) Applicant: HKC CORPORATION LIMITED, Guangdong (CN)

(72) Inventor: Jianfeng Shan, Guangdong (CN)

(73) Assignee: HKC Corporation Limited, Guangdong (CN)

( * ) Notice: Subject to any disclaimer, the term of this patent is extended or adjusted under 35 U.S.C. 154(b) by 566 days.

(21) Appl. No.: 16/317,318

(22) PCT Filed: Feb. 2, 2018

(86) PCT No.: PCT/CN2018/075060
§ 371 (c)(1),
(2) Date: Jan. 11, 2019

(87) PCT Pub. No.: WO2019/085310
PCT Pub. Date: May 9, 2019

(65) Prior Publication Data
US 2021/0335299 A1    Oct. 28, 2021

(30) Foreign Application Priority Data
Nov. 3, 2017    (CN) .......................... 201711071413.9

(51) Int. Cl.
*G09G 3/36* (2006.01)
*G02F 1/1362* (2006.01)

(52) U.S. Cl.
CPC ..... *G09G 3/3614* (2013.01); *G02F 1/136286* (2013.01); *G09G 3/3607* (2013.01);
(Continued)

(58) Field of Classification Search
CPC .............. G09G 3/3614; G09G 3/3607; G09G 2300/0452; G09G 2320/0247; G02F 1/136286
See application file for complete search history.

(56) References Cited

U.S. PATENT DOCUMENTS

2004/0090561 A1    5/2004  Song
2007/0052902 A1*   3/2007  Yoo .................... G02F 1/13624
                                                    349/144
(Continued)

FOREIGN PATENT DOCUMENTS

CN        2842649 Y       11/2006
CN      101251697 A        8/2008
(Continued)

OTHER PUBLICATIONS

International Search Report for Application No. PCT/CN20158/075060 dated Aug. 6, 2018, 11 pages.

*Primary Examiner* — Kwang-Su Yang
(74) *Attorney, Agent, or Firm* — Rosenberg, Klein & Lee

(57) ABSTRACT

The present disclosure provides a display panel and a display device, and the display panel includes: a plurality of data lines; a plurality of scan lines respectively interlaced with the plurality of data lines and forming a plurality of interlaced points at interlaced positions; and a plurality of pixel units, where each of the pixel units includes a plurality of sub-pixel units, which are arranged in an array of a plurality of columns in a first direction and a plurality of rows in a second direction, and are electrically connected to the plurality of interlaced points in a one-to-one correspondence. The same data line is electrically connected sequentially and alternately with the plurality of sub-pixel units arranged in two adjacent columns in the first direction. The present disclosure also provides a display device comprising the above display panel.

15 Claims, 9 Drawing Sheets

(52) U.S. Cl.
CPC ............... *G09G 2300/0452* (2013.01); *G09G 2320/0247* (2013.01)

(56) References Cited

U.S. PATENT DOCUMENTS

| | | |
|---|---|---|
| 2010/0001942 A1 | 1/2010 | Lin et al. |
| 2015/0294611 A1 | 10/2015 | Zheng et al. |
| 2016/0116807 A1* | 4/2016 | Lim .................... G09G 3/3614 349/37 |
| 2017/0116934 A1 | 4/2017 | Tien et al. |

FOREIGN PATENT DOCUMENTS

| | | |
|---|---|---|
| CN | 101349848 A | 1/2009 |
| CN | 103728746 A | 4/2014 |
| CN | 104049396 A | 9/2014 |
| CN | 105244002 A | 1/2016 |
| CN | 105304010 A | 2/2016 |
| CN | 106154668 A | 11/2016 |
| CN | 106444196 A | 2/2017 |
| CN | 107272290 A | 10/2017 |

* cited by examiner

DISPLAY PANEL AND DISPLAY DEVICE SUITABLE FOR LOW COLOR CAST DISPLAY

CROSS REFERENCE TO RELATED APPLICATIONS

This is a National Stage application of, and claims priority to, PCT/CN2018/075060, filed Feb. 2, 2018, which claims priority to Chinese Patent Application No. 201711071413.9, filed Nov. 3, 2017, the disclosures of which are incorporated herein by reference in their entirety.

TECHNICAL FIELD

The present disclosure relates to the technical field of display panel and display device, and more particularly, to a display panel and a display device suitable for a pixel arrangement technology for low color cast display.

BACKGROUND

The LCD (Liquid Crystal Display) has many advantages such as a thin body, power saving, no radiation, and etc., thus, it has been widely used. Most of the LCDs on the existing market are backlight-type LCDs, which comprise a display panel and a backlight module. The operation principle of the liquid crystal display panel is as follows: placing liquid crystal molecules between two parallel substrates, and applying a driving voltage on the two substrates to control a rotation direction of the liquid crystal molecules to refract the light of the backlight module to generate a picture. Because of the low power consumption, the excellent picture quality and the high production yield, the transistor array liquid crystal display has gradually occupied the leading position in the display field.

The transistor array liquid crystal display comprises two display modes of IPS (In Plane Switch) and VA (Vertical Alignment): the IPS mode is provided with a horizontal alignment of the liquid crystal, and in use, the liquid crystal molecules display the image in a rotating manner in a parallel state; and the VA mode is provided with a vertical alignment of the liquid crystal, when no voltage is applied, the liquid crystal molecules are perpendicular to the two substrates of the screen, and when the voltage is applied, the liquid crystal molecules fall down and form a certain angle with the substrates.

A major issue that must be faced in the development of liquid crystal displays with the vertical alignment display mode is the color cast problem at different viewing angles. The current solution is to add a dark area within a sub-pixel, and the dark area comprises positive and negative polarities to reduce screen flicker. However, if the position of the bright and dark areas is not set properly or the drive mode is unsuitable, there may be a problem that too frequent switching of the driving signal causes a temperature rise of the driving chip.

In the development trend of the display, reducing heat generation and power consumption has always been the focus of technical improvement. Therefore, in the design of the liquid crystal display panel with the vertical alignment mode, if the switching frequency of the data signal can be reduced, that is, the switching period is increased, it will be beneficial to reduce heat generation and power consumption.

SUMMARY

The technical problem to be solved by the embodiments of the present disclosure is to provide a display panel, which can effectively reduce the switching frequency of the data signal to reduce the heat generation and power consumption of the driving chip, and to solve the color cast problem of the display panel at different viewing angles.

The further technical problem to be solved by the embodiments of the present disclosure is to provide a display device, which can effectively reduce the switching frequency of the data signal to reduce the heat generation and power consumption of the driving chip, and to solve the color cast problem of the display panel at different viewing angles.

In order to solve the above technical problem, according to an embodiment of the present disclosure, the present disclosure provides a display panel, including:

a plurality of data lines;

a plurality of scanning lines respectively interlaced with the plurality of data lines and forming a plurality of interlaced points at interlaced positions; and a plurality of pixel units, wherein each of the pixel units includes a plurality of sub-pixel units, which are arranged in an array of a plurality of columns in a first direction and a plurality of rows in a second direction, and electrically connected to the plurality of interlaced points correspondingly;

wherein the same data line is sequentially, alternately and electrically connected with the plurality of sub-pixel units arranged in two adjacent columns in the first direction.

Alternatively, the plurality of sub-pixel units are arranged in an array of M*N, where M and N are positive integers, and for the plurality of sub-pixel units arranged in the i-th column and the (i+1)-th column, the same data line is electrically connected with the (j+1)-th to (j+n)-th sub-pixel units of the i-th column, the (j+n+1)-th to (j+2n)-th sub-pixel units of the (i+1)-th column, the (j+2n+1)-th to (j+3n)-th sub-pixel units of the i-th column, the (j+3n+1)-th to (j+4n)-th sub-pixel units of the (i+1)-th column, the (j+4n+1)-th to (j+5n)-th sub-pixel units of the i-th column and the (j+5n+1)-th to (j+6n)-th sub-pixel units sequentially, where i is a positive integer greater than 0 and less than N, j is a positive integer greater than 0 and less than M, and n is a positive integer greater than 0 and less than M.

Alternatively, the plurality of sub-pixel units arranged in the same column include two types of sub-pixel units with different colors, which are arranged alternately, so that the same data line is electrically connected to the plurality of sub-pixel units with the same color.

Alternatively, a plurality of sub-pixel units with the same color arranged in the same column are driven and controlled alternately by different voltage polarities.

Alternatively, a plurality of sub-pixel units with the same color arranged in the same column include a plurality of dark area sub-pixel units and a plurality of bright area sub-pixel units.

Alternatively, each pixel unit includes two red sub-pixel units, two green sub-pixel units and two blue sub-pixel units, and adjacent sub-pixel units with different colors are driven and controlled by different voltage polarities.

Alternatively, each pixel unit includes one red sub-pixel unit, one red dark area sub-pixel unit, one green sub-pixel unit, one green dark area sub-pixel unit, one blue sub-pixel unit and a blue dark area sub-pixel unit, and adjacent sub-pixel units with different colors are driven and controlled by different voltage polarities.

Alternatively, a plurality of sub-pixel units and dark area sub-pixel units of adjacent pixel units in the second direction are arranged opposite to each other.

In another aspect, the embodiment of the present disclosure further provides a display panel, including:

a plurality of data lines;

a plurality of scanning lines respectively interlaced with the plurality of data lines and forming a plurality of interlaced points at interlaced positions;

a plurality of pixel units, wherein each of the pixel units includes a plurality of sub-pixel units, which are arranged in an array of a plurality of columns in a first direction and a plurality of rows in a second direction, and are electrically connected to the plurality of interlaced points in a one-to-one correspondence;

wherein the plurality of sub-pixel units are arranged in an array of M*N, where M and N are positive integers, and for the plurality of sub-pixel units arranged in the i-th column and the (i+1)-th column, the same data line is electrically connected with the (j+1)-th to (j+n)-th sub-pixel units of the i-th column, the (j+n+1)-th to (j+2n)-th sub-pixel units of the (i+1)-th column, the (j+2n+1)-th to (j+3n)-th sub-pixel units of the i-th column, the (j+3n+1)-th to (j+4n)-th sub-pixel units of the (i+1)-th column, the (j+4n+1)-th to (j+5n)-th sub-pixel units of the i-th column and the (j+5n+1)-th to (j+6n)-th sub-pixel units sequentially, where i is a positive integer greater than 0 and less than N, j is a positive integer greater than 0 and less than M, and n is a positive integer greater than 0 and less than M.

Alternatively, the plurality of sub-pixel units arranged in the same column include two types of sub-pixel units with different colors, which are arranged alternately, so that the same data line is electrically connected to the plurality of sub-pixel units with the same color.

Alternatively, a plurality of sub-pixel units with the same color arranged in the same column are driven and controlled alternately by different voltage polarities.

Alternatively, a plurality of sub-pixel units with the same color arranged in the same column include a plurality of dark area sub-pixel units and a plurality of bright area sub-pixel units.

Alternatively, each pixel unit includes two red sub-pixel units, two green sub-pixel units and two blue sub-pixel units, and adjacent sub-pixel units with different colors are driven and controlled by different voltage polarities.

Alternatively, each pixel unit includes one red sub-pixel unit, one red dark area sub-pixel unit, one green sub-pixel unit, one green dark area sub-pixel unit, one blue sub-pixel unit and one blue dark area sub-pixel unit, and adjacent sub-pixel units with different colors are driven and controlled by different voltage polarities.

Alternatively, a plurality of sub-pixel units and dark area sub-pixel units of adjacent pixel units in the second direction are arranged opposite to each other.

In another aspect, the embodiment of the present disclosure further provides a display device, including:

a plurality of data lines;

a plurality of scanning lines respectively interlaced with the plurality of data lines and forming a plurality of interlaced points at interlaced positions;

a plurality of pixel units, wherein each of the pixel units includes a plurality of sub-pixel units, which are arranged in an array of a plurality of columns in a first direction and a plurality of rows in a second direction, and are electrically connected to the plurality of interlaced points in a one-to-one correspondence;

wherein the plurality of sub-pixel units are arranged in an array of M*N, where M and N are positive integers, and for the plurality of sub-pixel units arranged in the i-th column and the (i+1)-th column, the same data line is electrically connected with the (j+1)-th to (j+n)-th sub-pixel units of the i-th column, the (j+n+1)-th to (j+2n)-th sub-pixel units of the (i+1)-th column, the (j+2n+1)-th to (j+3n)-th sub-pixel units of the i-th column, the (j+3n+1)-th to (j+4n)-th sub-pixel units of the (i+1)-th column, the (j+4n+1)-th to (j+5n)-th sub-pixel units of the i-th column and the (j+5n+1)-th to (j+6n)-th sub-pixel units sequentially, where i is a positive integer greater than 0 and less than N, j is a positive integer greater than 0 and less than M, and n is a positive integer greater than 0 and less than M;

wherein the plurality of sub-pixel units arranged in the same column include two types of sub-pixel units with different colors, which are arranged alternately, so that the same data line is electrically connected to the plurality of sub-pixel units with the same color.

Wherein a plurality of sub-pixel units with the same color arranged in the same column are driven and controlled alternately by different voltage polarities.

Alternatively, a plurality of sub-pixel units with the same color arranged in the same column include a plurality of dark area sub-pixel units and a plurality of bright area sub-pixel units.

Alternatively, each pixel unit includes two red sub-pixel units, two green sub-pixel units and two blue sub-pixel units, and adjacent sub-pixel units with different colors are driven and controlled by different voltage polarities.

Alternatively, each pixel unit includes one red sub-pixel unit, one red dark area sub-pixel unit, one green sub-pixel unit, one green dark area sub-pixel unit, one blue sub-pixel unit and one blue dark area sub-pixel unit, and adjacent sub-pixel units with different colors are driven and controlled by different voltage polarities.

Alternatively, a plurality of sub-pixel units and dark area sub-pixel units of adjacent pixel units in the second direction are arranged opposite to each other.

By adopting the above technical solution, the embodiment of the present disclosure has at least the following beneficial effects: by adjusting the arrangement of the sub-pixel units in the adjacent pixel units and the connection manner of the data signal and the sub-pixel units, the switching period of the data signal can be extended, even if the upper and lower sub-pixel units are designed to have opposite driving polarities in order to reduce a crosstalk in the first direction caused by parasitic capacitance coupling, since the same data line is sequentially, alternately and electrically connected with the plurality of sub-pixel units arranged in two adjacent columns in the first direction, the data signal SD13 can be maintained at the same voltage level during a plurality of scanning periods, which means that the switching period becomes a plurality of scanning periods. Therefore, compared to the display panel with the conventional vertical alignment mode, the switching frequency of the data signal used in the display panel of the present disclosure can be greatly reduced, so that the temperature and power consumption of the driving chip can also be reduced.

BRIEF DESCRIPTION OF THE DRAWINGS

To illustrate the technical solutions according to the embodiments of the present disclosure more clearly, the accompanying drawings for describing the embodiments are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The technical solutions of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

It is to be understood that, when used in this specification and the appended claims, the terms "comprises" and "comprising" indicate the presence of the described features, integers, steps, operations, elements, and/or components, but do not preclude the presence or addition of one or more other features, integers, steps, operations, elements, components, and/or groups thereof.

Figure 1:
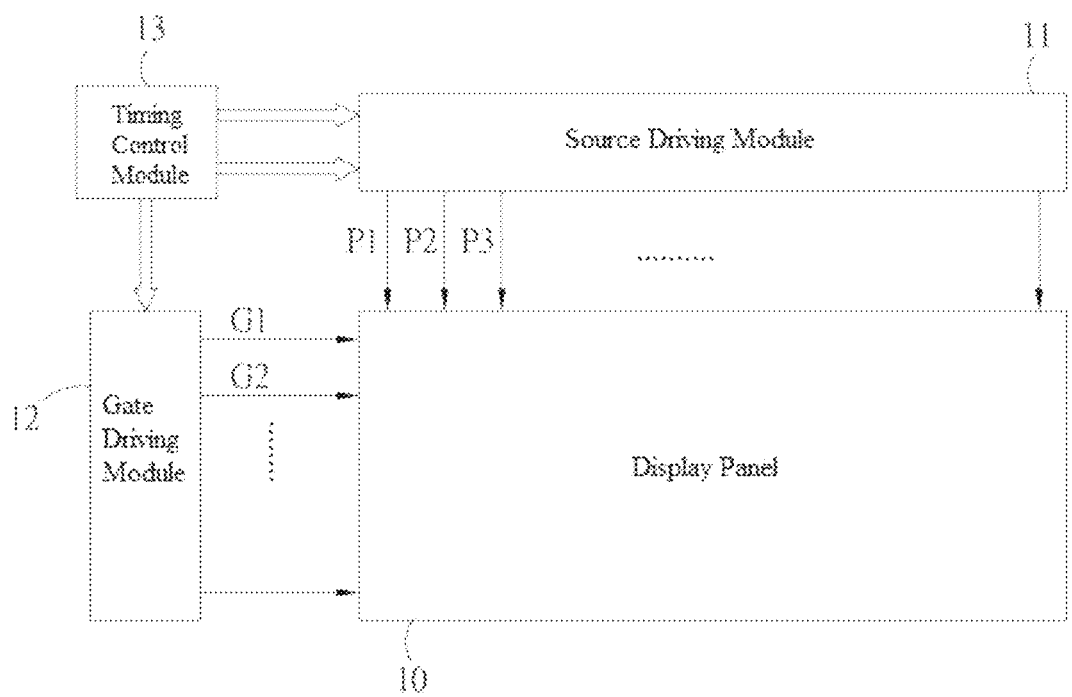
FIG. 1 is a schematic diagram illustrating a display panel and a display device.

Please refer to FIG. 1, FIG. 1 is a schematic diagram illustrating an display panel and an display device. A display apparatus comprises a display panel 10, a source driving module 11, a gate driving module 12, and a timing control module 13. The timing control module 13 generates different timings respectively to control the source driving module 11 and the gate driving module 12 to output driving signals to the display panel 10 to display a picture.

Figure 2A:
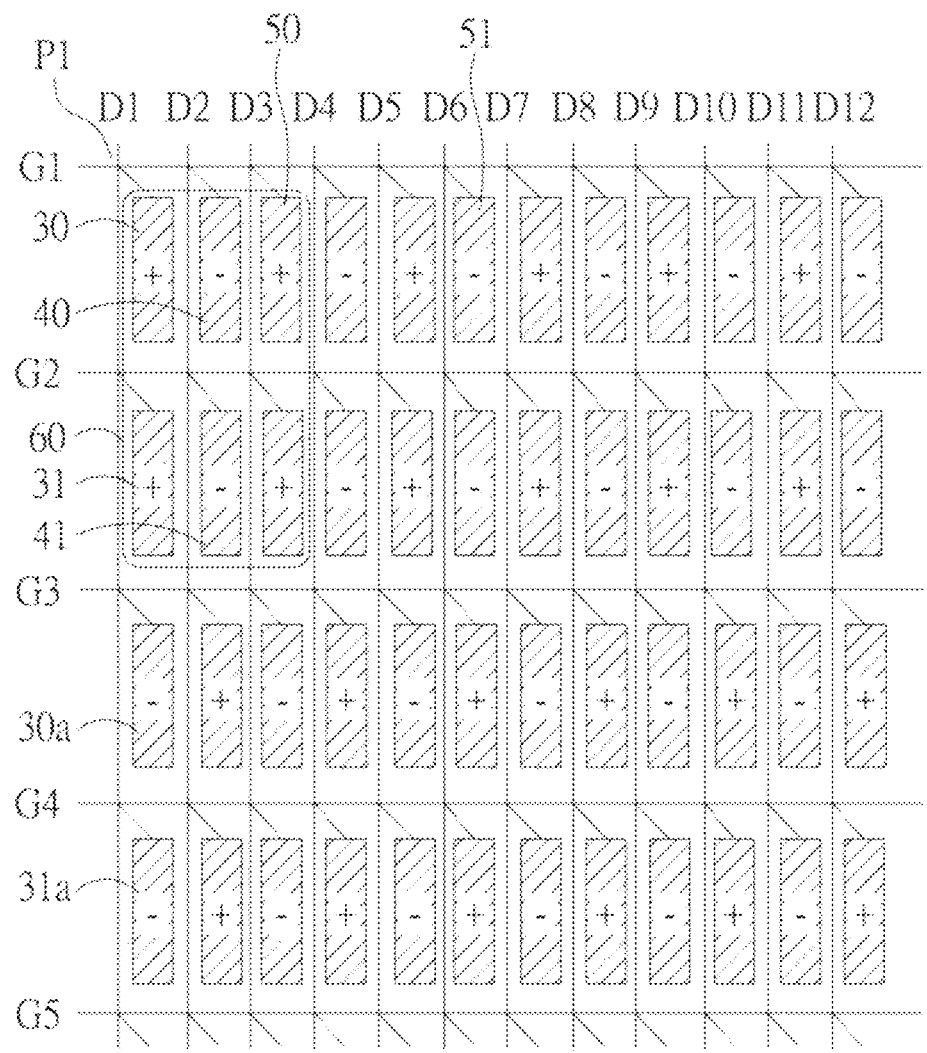
FIG. 2A is a schematic diagram illustrating pixel arrangement of a display panel with a conventional vertical alignment mode.
Figure 2B:
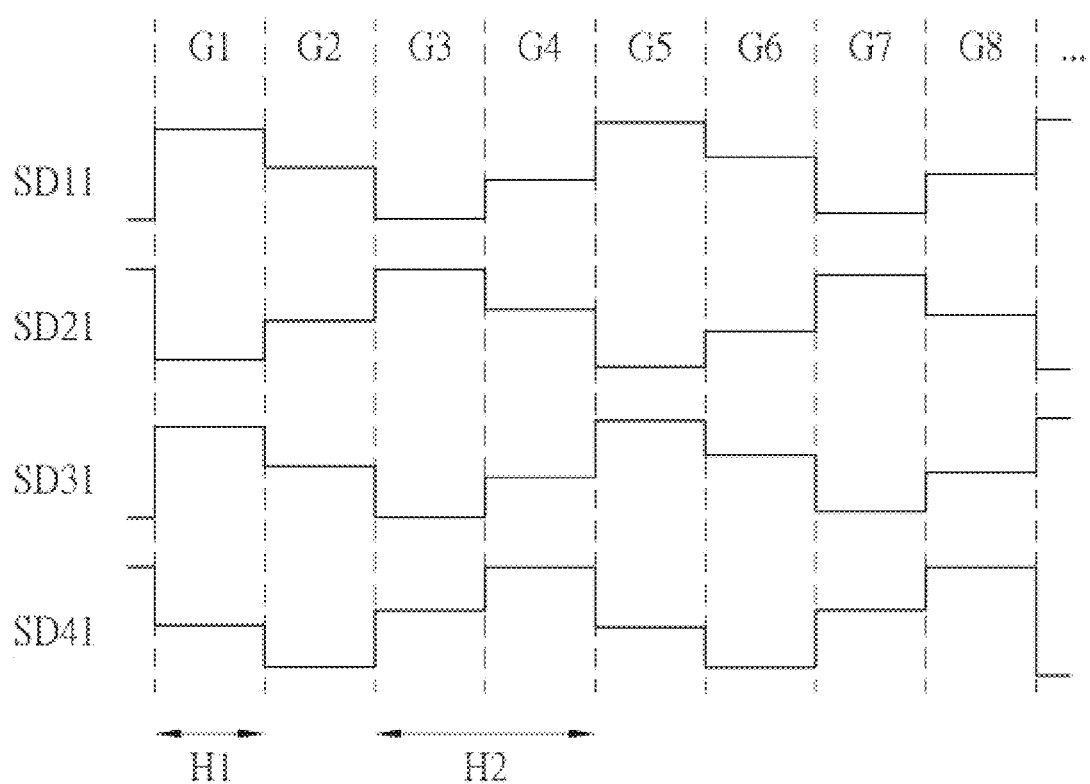
FIG. 2B is a data signal diagram suitable for the display panel of FIG. 2A.

Please refer to FIG. 2A and FIG. 2B, which are the schematic diagram illustrating the pixel arrangement of the display panel with the conventional vertical alignment mode, and the data signal diagram used by the display panel with the conventional vertical alignment mode. In the display panel with the vertical alignment mode, in order to increase the viewing angle, a plurality of sub-pixel units and corresponding dark area sub-pixel units are provided in the pixel units. As shown in FIG. 2A, a pixel unit 60 comprises a red sub-pixel unit 30 and a red dark sub-pixel unit 31, a green sub-pixel unit 40, a green dark area sub-pixel unit 41, a blue sub-pixel unit 50, and a blue dark area sub-pixel unit 51.

In order to make the display more uniform and reduce flicker, the arrangements of the sub-pixel units of adjacent pixel units in a horizontal direction are opposite, and driving polarities of the sub-pixel units with a same color are opposite, and the sub-pixel units with the opposite driving polarity are distinguished by + and − in FIG. 2A; the arrangements of the sub-pixel units of adjacent pixel units in a vertical direction are the same, and the driving polarities of the sub-pixel units with the same color are opposite. The upper and lower sub-pixel units have a design with the opposite driving polarities to mitigate vertical crosstalk caused by parasitic capacitive coupling.

As shown in FIG. 2B, a voltage of a data signal applied by the dark area sub-pixel unit is lower than the voltage of the data signal of a general sub-pixel unit. For example, a data line D1 inputs the data signal SD1 during the startup of the scanning lines G1 to G4, respectively, so that the data signal SD1 applies a high voltage level signal to the red sub-pixel unit 30 (with a positive driving polarity) during the startup of the scanning line G1, and the data signal SD1 applies a medium voltage level signal to the red dark area sub-pixel unit 31 (with the positive driving polarity) during the startup of the scanning line G2, and the data signal SD1 applies a low voltage level signal to red sub-pixel unit 30a (with a negative driving polarity) during the startup of the scanning line G3, and the data signal SD1 applies a medium voltage level signal to red dark area sub-pixel unit 31a (with the negative driving polarity) during the startup of the scanning line G4. By analogy, the data signals SD2 to SD4 on the scanning lines G2 to G4 can be obtained.

However, it can be seen from FIG. 2B that the period (H2) in which the data signals SD11 to SD41 are switched from the low voltage level to the high voltage level is twice the scanning period (H1) of the scanning line.

Figure 3:
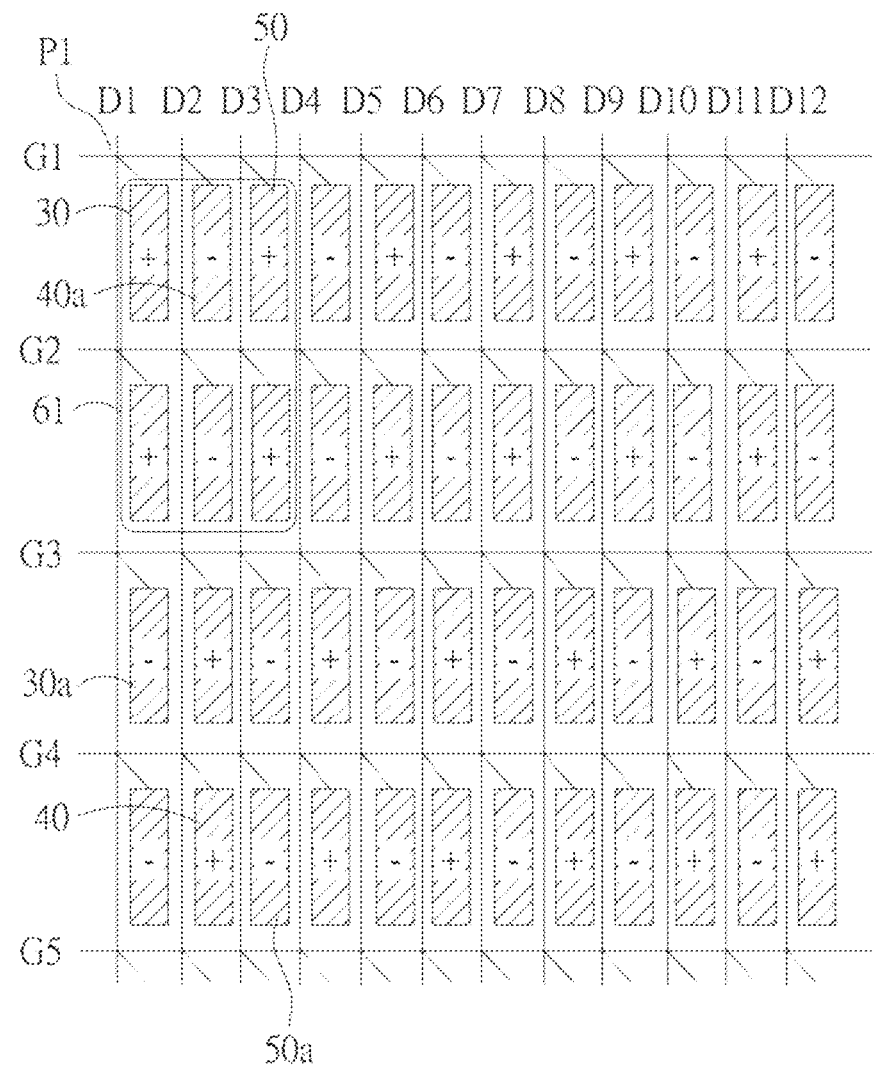
FIG. 3 is a schematic diagram illustrating another pixel arrangement of a display panel with another conventional vertical alignment mode.
Figure 4:
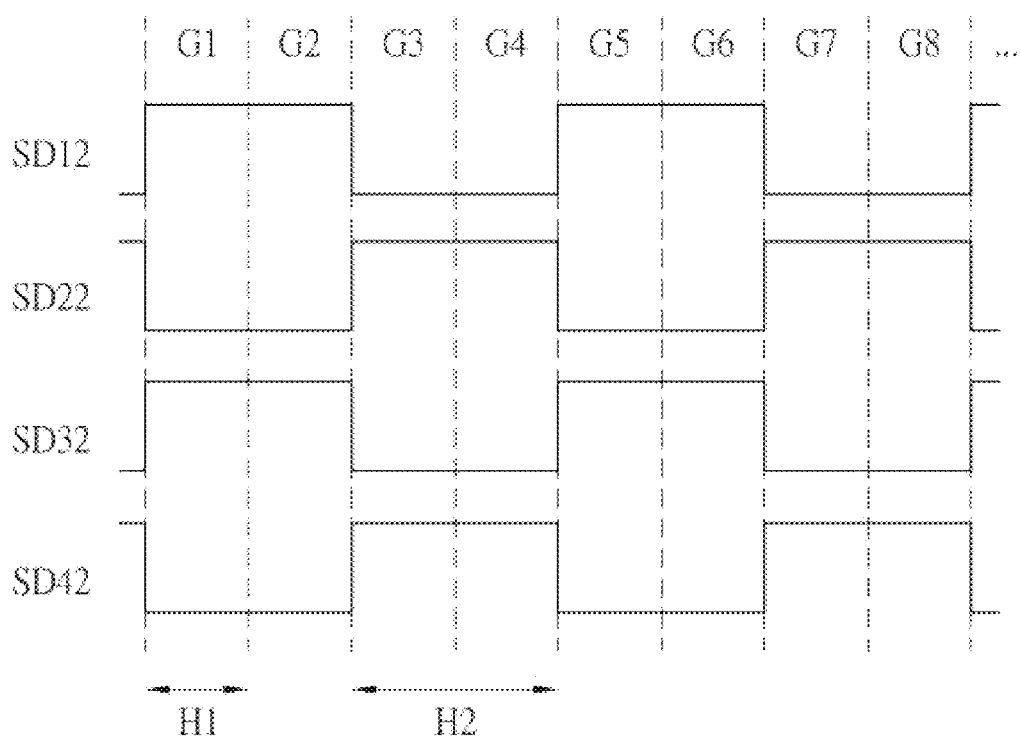
FIG. 4 is a data signal diagram suitable for the display panel of FIG. 3.

Please refer to FIG. 3 and FIG. 4, which are the schematic diagram illustrating the pixel arrangement of the display panel with another conventional vertical alignment mode, and the data signal diagram used by the display panel with the conventional vertical alignment mode. As shown in FIG. 3, the difference between the liquid crystal display panel with the conventional vertical alignment mode and the previous exemplary liquid crystal display panel is that the dark area sub-pixel unit is omitted, but the pixel rendering is adopted. The pixel unit 61 comprises two red sub-pixel units 30 (with the positive driving polarity), two green sub-pixel units 40a (with the negative driving polarity) and two blue sub-pixel units 50 (with the positive driving polarity), and adjacent different sub-pixel units are driven by different voltage level. The driving polarities of the sub-pixel units with the same color in the pixel units arranged adjacently in the horizontal direction and the vertical direction are opposite, so that as shown in FIG. 3, the pixel units below and to the right of the pixel unit 61 comprise two red sub-pixel units 30a (with the negative driving polarity), two green sub-pixel units 40 (with the positive driving polarity), and two blue sub-pixel units 50a (with the negative driving polarity).

It can be seen from FIG. 4 that the period (H2) in which the data signals SD12 to SD42 are switched from the low voltage level to the high voltage level is also twice the scanning period (H1) of the scanning line.

Figure 5:
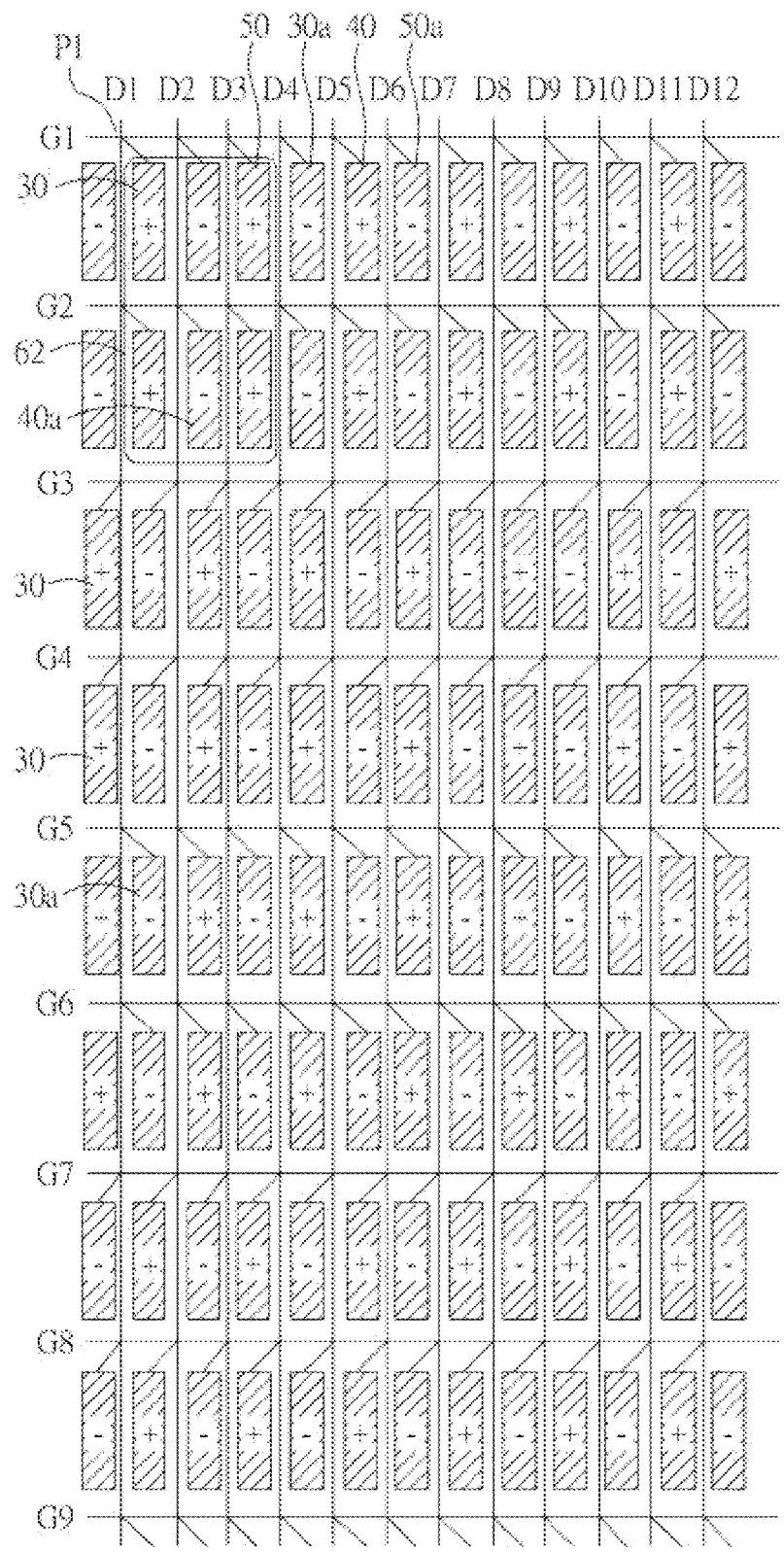
FIG. 5 is a schematic diagram illustrating an embodiment of pixel arrangement of a display panel of the present disclosure.
Figure 6:
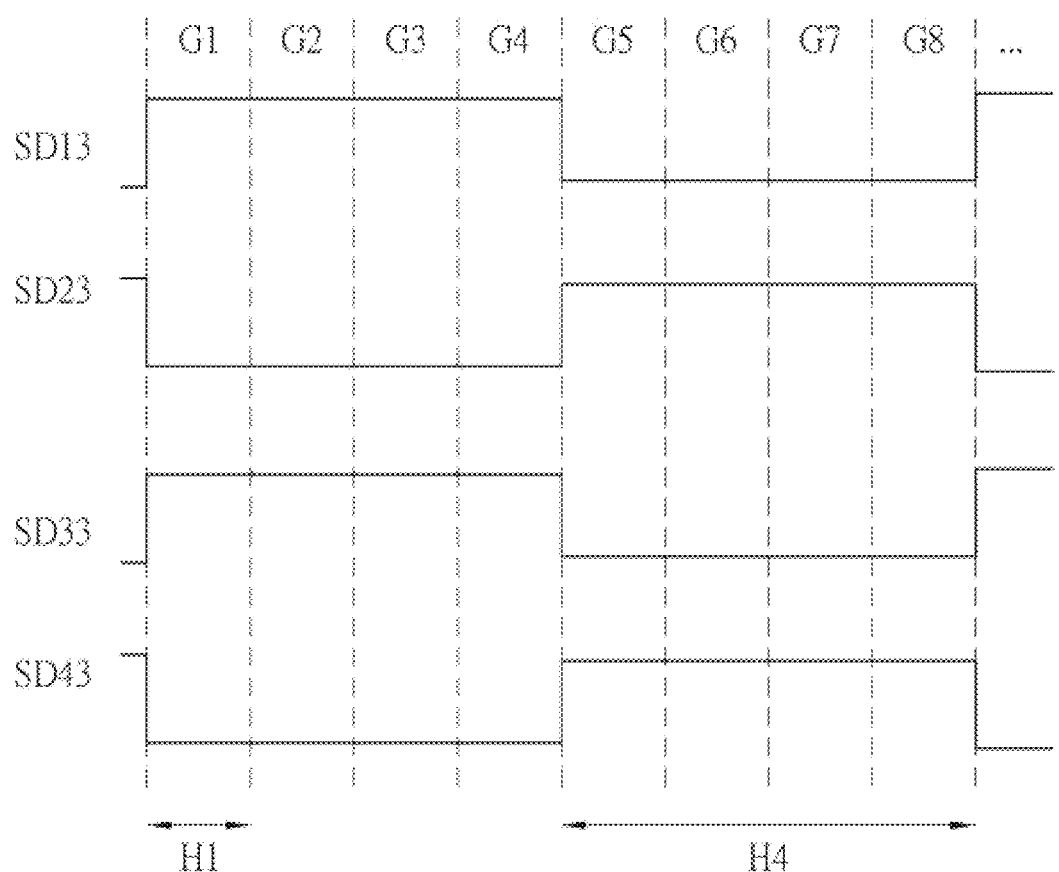
FIG. 6 is a data signal diagram suitable for the display panel of FIG. 5.

Please refer to FIG. 5 and FIG. 6, which are the schematic diagram illustrating the embodiment of the pixel arrangement of the display panel of the present disclosure, and the data signal diagram used by the embodiment. As shown in FIG. 5, the display panel comprises data lines D1 to Du, scanning lines G1 to Gv, and a plurality of pixel units 30, where u and v are positive integers, and only a number of data lines and scanning lines are shown in the figure for illustration purposes.

The scanning lines G1 to Gv are interlaced with the data lines D1 to Du respectively, and a plurality of interlaced points P1 are formed at interlaced portions, and the plurality of sub-pixel units are correspondingly and electrically connected to the plurality of interlaced points P1.

Each pixel units 30 comprises a plurality of sub-pixel units that comprise different colors and driving polarities. In this embodiment, in the second direction (e.g., the horizontal direction), the sub-pixel units in adjacent pixel units have the same color arrangement, but the sub-pixel units with the same position and color have the opposite driving polarities. For example, in FIG. 5, the sub-pixel units in the pixel unit 62 are red, green and blue from left to right, and the colors of the sub-pixel units in the adjacent pixel unit to the right of the pixel unit 62 are also red, green and blue from left to right; however, the red sub-pixel units of the pixel unit 62 have positive driving polarity, while the red sub-pixel units in the adjacent pixel unit to the right of the pixel unit 62 have negative driving polarity; the same design is also applicable to the driving polarity design of the green and blue sub-pixel units.

In the second direction, the sub-pixel units in adjacent pixel units have different color arrangements and driving polarities. For example, in FIG. 5, the sub-pixel units in the pixel unit 62 are red, green and blue from left to right, and the colors of the sub-pixel units in the adjacent pixel unit below the pixel unit 62 are green, blue and red from left to right; and, the red sub-pixel units of the pixel unit 62 have positive driving polarity, while the red sub-pixel units in the adjacent pixel unit below the pixel unit 62 have negative driving polarity.

The difference between the display panel of the present disclosure and the display panel with the conventional vertical alignment mode is that in the display panel with the conventional vertical alignment mode, the sub-pixel units on the same column in the first direction (e.g., the vertical direction) are connected to the same data line; while, in the present disclosure, the same data line is sequentially, alternately and electrically connected with two columns of sub-pixel units arranged adjacently in the first direction.

For example, in FIG. 5, from top to bottom, the data line D1 sequentially connects to the first and second red sub-pixel units of the second column of the sub-pixel units (with the positive driving polarity), the third and the fourth red sub-pixel units of the first column of the sub-pixel units (with the positive driving polarity), the fifth and sixth red sub-pixel units of the second column of the sub-pixel units (with the negative driving polarity), and the seventh and the eighth red sub-pixel unit of the first column of the sub-pixel units (with the negative driving polarity), and so on.

Similarly, from top to bottom, the data line D2 sequentially connects to the first and second green sub-pixel units of the third column of the sub-pixel units (with the negative driving polarity), the third and the fourth red sub-pixel units of the second column of the sub-pixel units (with the negative driving polarity), the fifth and sixth green sub-pixel units of the third column of the sub-pixel units (with the positive driving polarity), and the seventh and the eighth green sub-pixel unit of the second column of the sub-pixel units (with the positive driving polarity), and so on.

Similarly, from top to bottom, the data line D3 sequentially connects to the first and second blue sub-pixel units of the fourth column of the sub-pixel units (with the positive driving polarity), the third and the fourth blue sub-pixel units of the third column of the sub-pixel units (with the positive driving polarity), the fifth and sixth blue sub-pixel units of the fourth column of the sub-pixel units (with the negative driving polarity), and the seventh and the eighth blue sub-pixel unit of the third column of the sub-pixel units (with the negative driving polarity), and so on.

By adjusting the arrangement of the sub-pixel units in the adjacent pixel units and the connection manner of the data signal and the sub-pixel units, the switching period of the data signal can be extended, as shown in FIG. 6, even if the upper and lower sub-pixel units are designed to have opposite driving polarities in order to reduce a crosstalk in the first direction caused by parasitic capacitance coupling, since the same data line is sequentially, alternately and electrically connected with the plurality of sub-pixel units arranged in two adjacent columns in the first direction, the data signal SD13 can be maintained at the same voltage level during four scanning periods, which means that the switching period becomes four scanning periods. Therefore, compared to the display panel with the conventional vertical alignment mode, the switching frequency of the data signal SD13 to SD43 used in the display panel of the present disclosure can be reduced by half, so that the temperature and power consumption of the driving chip can also be reduced by about half.

It should be noted that in the embodiment shown in FIG. 5, the switching period of the data signal can be extended to four scanning periods, but the present disclosure is not limited thereto; in practical applications, according to the same design principle, the switching period of the data signal can be extended to 8 scanning periods, 12 scanning periods, or 16 scanning periods, and the like.

Figure 7:
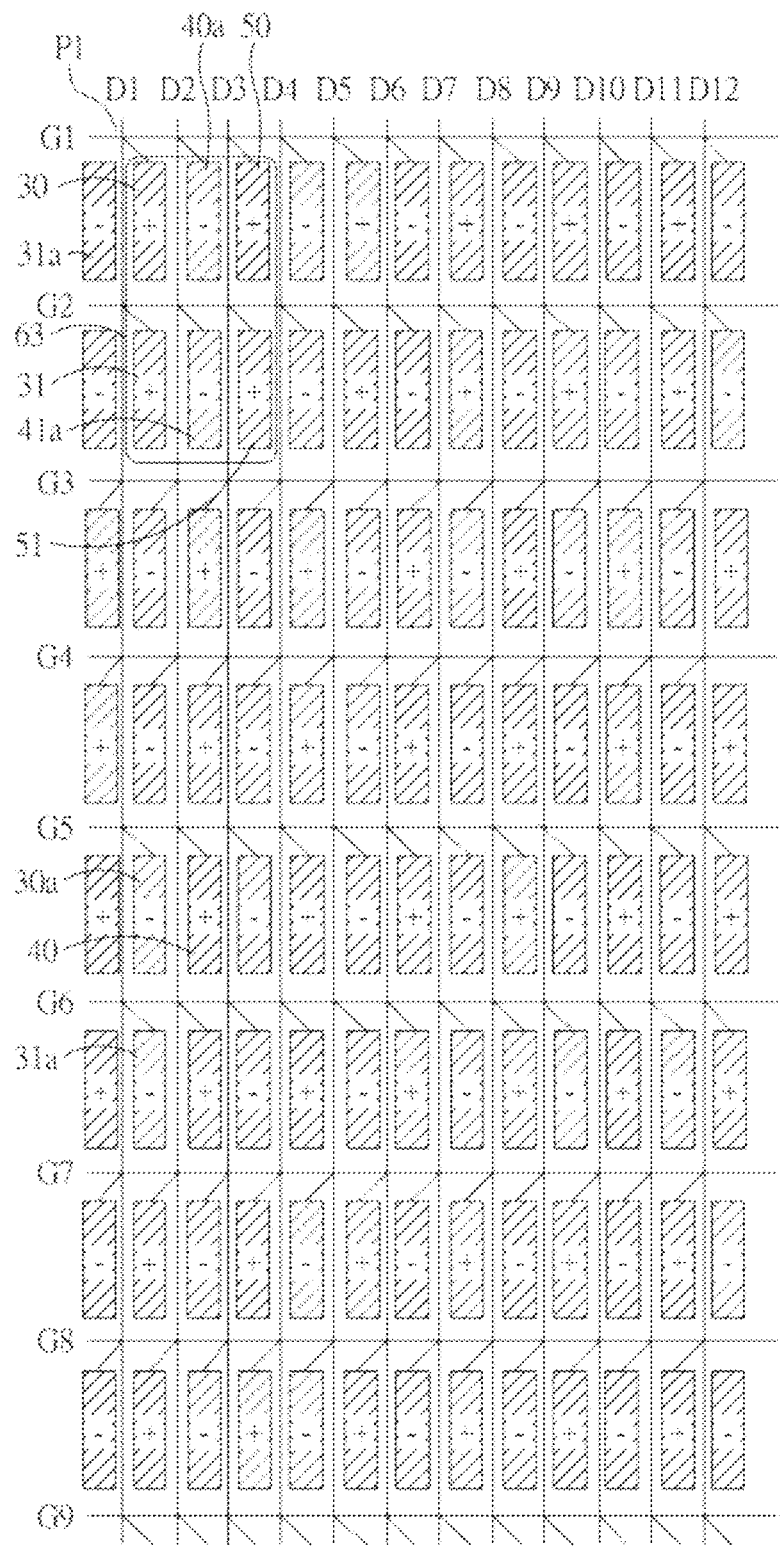
FIG. 7 is a schematic diagram illustrating another embodiment of pixel arrangement of a display panel of the present disclosure.
Figure 8:
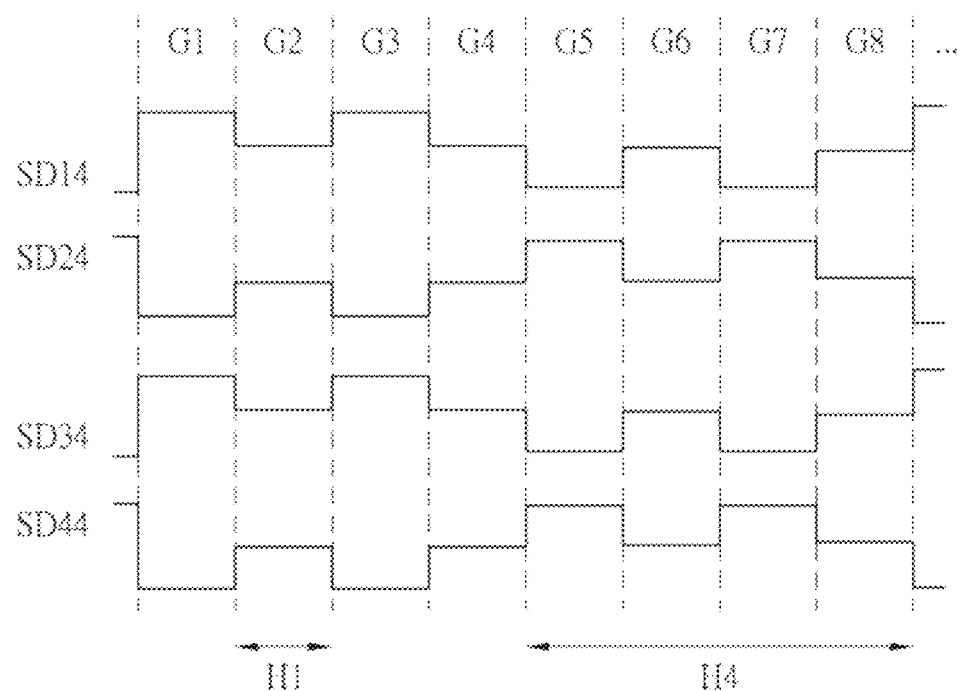
FIG. 8 is a data signal diagram suitable for the display panel of FIG. 7.

Please refer to FIG. 7 and FIG. 8, which are the schematic diagram illustrating another embodiment of the pixel arrangement of the display panel of the present disclosure, and the data signal diagram used by the embodiment.

The difference between the pixel arrangement of the display panel shown in FIG. 7 and that shown in FIG. 5 is that the pixel units of the display panel shown in FIG. 7 comprise the dark area sub-pixel unit, for example, the pixel unit 63 comprises the red sub-pixel unit 30 (with positive driving polarity), the green sub-pixel unit 40a (with negative driving polarity), the blue sub-pixel unit 50 (with positive driving polarity), the red dark area sub-pixel unit 31 (with positive driving polarity), the green dark area sub-pixel unit 41a (with negative driving polarity) and blue dark area sub-pixel single 51 (with positive driving polarity).

Similar to FIG. 5, the same data line of the display panel shown in FIG. 7 is sequentially, alternately and electrically connected with two columns sub-pixel units arranged adjacently in the first direction.

From top to bottom, the data line D1 sequentially connects the first red sub-pixel unit (with the positive driving polarity) and the second red dark area sub-pixel unit (with the positive driving polarity) of the second column of the sub-pixel units, the third red sub-pixel unit (with the positive driving polarity) and the fourth red dark area sub-pixel unit (with the positive driving polarity) of the first column of the sub-pixel units, the fifth red sub-pixel unit (with the negative driving polarity) and the sixth red dark area sub-pixel unit (with the negative driving polarity) of the second column of the sub-pixel units, and the seventh red sub-pixel unit (with the negative driving polarity) and the eight red dark area sub-pixel unit (with the negative driving polarity) of the first column of the sub-pixel units, and so on.

By adjusting the arrangement of the sub-pixel units in the adjacent pixel units and the connection manner of the data signal and the sub-pixel units, the switching period of the data signal can be extended. As shown in FIG. 8, in this embodiment, it achieves the effect of reducing the switching frequency of the data signals SD14 to SD44 and reducing the temperature and power consumption of the driving chip.

In summary, the main technical characteristics of the present disclosure are as follows: the plurality of sub-pixel units are arranged in an array of M*N, where M and N are positive integers, and for the plurality of sub-pixel units arranged in the i-th column and the (i+1)-th column, the same data line is sequentially and electrically connected with the (j+1)-th to (j+n)-th sub-pixel units of the i-th column, the (j+n+1)-th to (j+2n)-th sub-pixel units of the (i+1)-th column, the (j+2n+1)-th to (j+3n)-th sub-pixel units of the i-th column, the (j+3n+1)-th to (j+4n)-th sub-pixel units of the (i+1)-th column, the (j+4n+1)-th to (j+5n)-th sub-pixel units of the i-th column and the (j+5n+1)-th to (j+6n)-th sub-pixel units, where i is a positive integer greater than 0 and less than N, j is a positive integer greater than 0 and less than M, and n is a positive integer greater than 0 and less than M.

For example, in FIG. 5 and FIG. 7, since it is set to 2, the same data line is changed to connect to the sub-pixel units in another column every two sub-pixel units in the first direction.

The above descriptions are specific embodiments of the present disclosure rather than limit the scope of protection of the disclosure. Those skilled in the art may easily make equivalent modifications or replacements without departing from the scope of the technical solutions, which shall fall within the scope of protection of the present disclosure. Therefore, the scope of protection of this disclosure should be determined by the scope of protection of the claims.

What is claimed is:

1. A display panel, comprising:
    a plurality of data lines;
    a plurality of scanning lines respectively interlaced with the plurality of data lines and forming a plurality of interlaced points at interlaced positions; and a plurality of pixel units, wherein each of the pixel units comprises a plurality of sub-pixel units, which are arranged in an array of a plurality of columns in a first direction and a plurality of rows in a second direction, and electrically connected to the plurality of interlaced points correspondingly,
    wherein the same data line is sequentially, alternately and electrically connected with the plurality of sub-pixel units arranged in two adjacent columns in the first direction,
    wherein the plurality of sub-pixel units arranged in the same column comprise two types of sub-pixel units with different colors, which are arranged alternately, so that the same data line is electrically connected to the plurality of sub-pixel units with the same color, and
    wherein the plurality of sub-pixel units with the same color arranged in the same column are driven and controlled alternately by different voltage polarities.

2. The display panel of claim 1, wherein the plurality of sub-pixel units are arranged in an array of M*N, where M and N are positive integers, and for the plurality of sub-pixel units arranged in the i-th column and the (i+1)-th column, the same data line is electrically connected with the (j+1)-th to (j+n)-th sub-pixel units of the i-th column, the (j+n+1)-th to (j+2n)-th sub-pixel units of the (i+1)-th column, the (j+2n+1)-th to (j+3n)-th sub-pixel units of the i-th column, the (j+3n+1)-th to (j+4n)-th sub-pixel units of the (i+1)-th column, the (j+4n+1)-th to (j+5n)-th sub-pixel units of the i-th column and the (j+5n+1)-th to (j+6n)-th sub-pixel units sequentially, where i is a positive integer greater than 0 and less than N, j is a positive integer greater than 0 and less than M, and n is a positive integer greater than 0 and less than M.

3. The display panel of claim 1, wherein a plurality of sub-pixel units with the same color arranged in the same column comprise a plurality of dark area sub-pixel units and a plurality of bright area sub-pixel units.

4. The display panel of claim 1, wherein each pixel unit comprises two red sub-pixel units, two green sub-pixel units and two blue sub-pixel units, and adjacent sub-pixel units with different colors are driven and controlled by different voltage polarities.

5. The display panel of claim 1, wherein each pixel unit comprises one red sub-pixel unit, one red dark area sub-pixel unit, one green sub-pixel unit, one green dark area sub-pixel unit, one blue sub-pixel unit and one blue dark area sub-pixel unit, and adjacent sub-pixel units with different colors are driven and controlled by different voltage polarities.

6. The display panel of claim 5, wherein a plurality of sub-pixel units and dark area sub-pixel units of adjacent pixel units in the second direction are arranged opposite to each other.

7. A display panel, comprising:
    a plurality of data lines;
    a plurality of scanning lines respectively interlaced with the plurality of data lines and forming a plurality of interlaced points at interlaced positions; and a plurality of pixel units, wherein each of the pixel units comprises a plurality of sub-pixel units, which are arranged in an array of a plurality of columns in a first direction and a plurality of rows in a second direction, and are electrically connected to the plurality of interlaced points in a one-to-one correspondence,
    wherein the plurality of sub-pixel units are arranged in an array of M*N, where M and N are positive integers, and for the plurality of sub-pixel units arranged in the i-th column and the (i+1)-th column, the same data line is electrically connected with the (j+1)-th to (j+n)-th sub-pixel units of the i-th column, the (j+n+1)-th to (j+2n)-th sub-pixel units of the (i+1)-th column, the (j+2n+1)-th to (j+3n)-th sub-pixel units of the i-th column, the (j+3n+1)-th to (j+4n)-th sub-pixel units of the (i+1)-th column, the (j+4n+1)-th to (j+5n)-th sub-pixel units of the i-th column and the (j+5n+1)-th to (j+6n)-th sub-pixel units sequentially, where i is a positive integer greater than 0 and less than N, j is a positive integer greater than 0 and less than M, and n is a positive integer greater than 0 and less than M,
    wherein the plurality of sub-pixel units arranged in the same column comprise two types of sub-pixel units with different colors, which are arranged alternately, so that the same data line is electrically connected to the plurality of sub-pixel units with the same color; and
    wherein the plurality of sub-pixel units with the same color arranged in the same column are driven and controlled alternately by different voltage polarities.

8. The display panel of claim 7, wherein a plurality of sub-pixel units with the same color arranged in the same column comprise a plurality of dark area sub-pixel units and a plurality of bright area sub-pixel units.

9. The display panel of claim 7, wherein each pixel unit comprises two red sub-pixel units, two green sub-pixel units and two blue sub-pixel units, and adjacent sub-pixel units with different colors are driven and controlled by different voltage polarities.

10. The display panel of claim 7, wherein each pixel unit comprises one red sub-pixel unit, one red dark area sub-pixel unit, one green sub-pixel unit, one green dark area sub-pixel unit, one blue sub-pixel unit and one blue dark area sub-pixel unit, and adjacent sub-pixel units with different colors are driven and controlled by different voltage polarities.

11. The display panel of claim 10, wherein a plurality of sub-pixel units and dark area sub-pixel units of adjacent pixel units in the second direction are arranged opposite to each other.

12. A display device, comprising:
   a plurality of data lines;
   a plurality of scanning lines respectively interlaced with the plurality of data lines and forming a plurality of interlaced points at interlaced positions; and
   a plurality of pixel units, wherein each of the pixel units comprises a plurality of sub-pixel units, which are arranged in an array of a plurality of columns in a first direction and a plurality of rows in a second direction, and are electrically connected to the plurality of interlaced points in a one-to-one correspondence, wherein the plurality of sub-pixel units are arranged in an array of M*N, where M and N are positive integers, and for the plurality of sub-pixel units arranged in the i-th column and the (i+1)-th column, the same data line is electrically connected with the (j+1)-th to (j+n)-th sub-pixel units of the i-th column, the(j+n+1)-th to (j+2n)-th sub-pixel units of the (i+1)-th column, the(j+2n+1)-th to (j+3n)-th sub-pixel units of the i-th column, the(j+3n+1)-th to (j+4n)-th sub-pixel units of the (i+1)-th column, the(j+4n+1)-th to (j+5n)-th sub-pixel units of the i-th column and the (j+5n+1)-th to (j+6n)-th sub-pixel units sequentially, where i is a positive integer greater than 0 and less than N, j is a positive integer greater than 0 and less than M, and n is a positive integer greater than 0 and less than M, and
   wherein a plurality of sub-pixel units with the same color arranged in the same column are driven and controlled alternately by different voltage polarities.

13. The display panel of claim 12, wherein a plurality of sub-pixel units with the same color arranged in the same column comprise a plurality of dark area sub-pixel units and a plurality of bright area sub-pixel units.

14. The display panel of claim 12, wherein each pixel unit comprises two red sub-pixel units, two green sub-pixel units and two blue sub-pixel units, and adjacent sub-pixel units with different colors are driven and controlled by different voltage polarities.

15. The display panel of claim 12, wherein each pixel unit comprises one red sub-pixel unit, one red dark area sub-pixel unit, one green sub-pixel unit, one green dark area sub-pixel unit, one blue sub-pixel unit and one blue dark area sub-pixel unit, and adjacent sub-pixel units with different colors are driven and controlled by different voltage polarities.

* * * * *